United States Patent [19]

Bolt

[11] Patent Number: 5,650,002
[45] Date of Patent: Jul. 22, 1997

US005650002A

[54] TIO$_2$ LIGHT SCATTERING EFFICIENCY WHEN INCORPORATED IN COATINGS

[75] Inventor: John Davis Bolt, Landenberg, Pa.

[73] Assignee: E. I. Du Pont de Nemours and Company, Wilmington, Del.

[21] Appl. No.: 558,116

[22] Filed: Nov. 13, 1995

[51] Int. Cl.$^6$ .................... C09C 1/36; C09C 3/06
[52] U.S. Cl. .................... 106/438; 106/436; 106/439; 106/441; 106/442; 106/443; 106/444; 106/445; 106/449; 428/403; 428/404
[58] Field of Search .................... 428/403, 404; 106/436, 438, 439, 441, 442, 443, 444, 449, 445

[56] References Cited

U.S. PATENT DOCUMENTS

| | | | |
|---|---|---|---|
| 3,297,535 | 1/1967 | Butler et al. | 167/82 |
| 3,737,371 | 6/1973 | Bazler et al. | 162/181 B |
| 3,832,206 | 8/1974 | Libera et al. | 106/436 |
| 3,873,335 | 3/1975 | Schmidt et al. | 106/442 |
| 4,011,096 | 3/1977 | Sandell | 106/291 |
| 4,090,887 | 5/1978 | Marquisee et al. | 106/309 |
| 4,132,560 | 1/1979 | Marquisee et al. | 106/293 |
| 4,421,660 | 12/1983 | Solcneehajna | 252/62.54 |
| 4,474,909 | 10/1984 | Smith et al. | 523/220 |
| 4,608,401 | 8/1986 | Martin | 523/205 |
| 5,116,418 | 5/1992 | Kaliski | 106/419 |
| 5,269,840 | 12/1993 | Morris et al. | 106/438 |
| 5,312,484 | 5/1994 | Kaliski | 106/446 |
| 5,346,546 | 9/1994 | Kaliski | 106/436 |

FOREIGN PATENT DOCUMENTS

| | | | |
|---|---|---|---|
| 10710/76 | 4/1977 | Australia. | |
| 05 49 163 | 12/1992 | European Pat. Off.. | |
| 36 44 132 | 12/1986 | Germany. | |
| 2-51419 | 8/1988 | Japan. | |
| 4-153232 | 10/1990 | Japan. | |
| 3-275768 | 12/1991 | Japan | 106/442 |
| 2267286 | 1/1993 | United Kingdom. | |
| 2267503 | 5/1993 | United Kingdom. | |

*Primary Examiner*—Melissa Bonner
*Attorney, Agent, or Firm*—D. W. Sullivan

[57] ABSTRACT

A TiO$_2$ pigment particle having a surface coating of inorganic particles or mineral particles exhibiting improved light scattering efficiency of TiO$_2$ at a moderate to high pigment volume concentration (PVC) and a low oil absorption when incorporated in coatings applications is disclosed, and methods of accomplishing the same.

17 Claims, No Drawings

TIO₂ LIGHT SCATTERING EFFICIENCY WHEN INCORPORATED IN COATINGS

BACKGROUND OF THE INVENTION

The present invention relates to a $TiO_2$ pigment particle having a surface coating of inorganic particles wherein improved light scattering efficiency of $TiO_2$ is achieved at a moderate to a high pigment volume concentration (PVC) when incorporated in coatings applications, and methods of accomplishing the same.

Inorganic pigments, and especially $TiO_2$, are often incorporated in various polymers as whiteners, tinting agents or opacifiers. $TiO_2$ is particularly useful for these purposes because it scatters light very efficiently. However a problem encountered is that as the PVC increases in the polymer, the $TiO_2$ particles come close to or in contact with other $TiO_2$ particles which reduces the scattering efficiency of the $TiO_2$, i.e., an optical crowding effect. Typically, scattering efficiency or scattering coefficient is measured by hiding power and tinting strength. While prior art techniques attempt to minimize the foregoing problem, they are deficient in one or more areas. For example, extenders have been added to paint formulations to space the $TiO_2$ to preserve its scattering efficiency, however, these extenders are difficult to distribute within the paint matrix to maximize the $TiO_2$ hiding power. Extenders are typically larger particles and/or in the form of aggregates and thus tend to increase the effective $TiO_2$ volume concentration and decrease scattering efficiency as they are added to replace paint resin content as described in F. Stieg, "The Effect of Extenders on the Hiding Power of Titanium Pigments", *Official Digest*, 1959, pp. 52–64.

Further, hydrous silica with high surface area can be precipitated onto the surface of the $TiO_2$ exhibiting some improvement in scattering efficiency at increasing PVC. However, the $TiO_2$ pigments with hydrous silica coatings with high surface area have a high oil absorption which degrades the paint film integrity, decreases a critical pigment volume concentration (CPVC) as defined hereinbelow and restricts a paint maker of flexibility in formulating paints. In addition, silicas such as fumed silica are composed of many primary particles which are highly aggregated and cannot be distributed uniformly on the $TiO_2$ surface.

Similarly, use of a polymer coating is expensive and difficult to accomplish and has resulted in severe agglomeration of the $TiO_2$ particles.

There is a need for a product that has improved scattering efficiency at moderate to high PVC. Concomitantly, there is a need for a $TiO_2$ having a low oil absorption so that the paint film integrity can be maintained. The present invention meets these needs.

SUMMARY OF THE INVENTION

In accordance with this invention there is provided:

a $TiO_2$ pigment having improved light scattering efficiency consisting essentially of $TiO_2$ pigment particles comprising substantially discrete inorganic particles having an average size within a range of about 5 to about 100 nm in diameter which are dispersed on the surface of the $TiO_2$ particles, and processes for preparing the same.

The composition and processes are characterized by some of the following advantages which cumulatively render the composition and processes preferable to compositions and processes previously employed:

1. improved scattering efficiency of $TiO_2$ is achieved at moderate to high PVC;
2. low oil absorption of the $TiO_2$;
3. provides a paint maker with flexibility in formulation;
4. dilution of $TiO_2$ content is minimized;
5. better dispersion and uniformity of the inorganic particles is achieved; and
6. equal hiding power can be achieved with less $TiO_2$ or improved hiding power can be achieved using the same amount of $TiO_2$ in end use applications.

DETAILED DESCRIPTION

The production of $TiO_2$ by the vapor phase oxidation of $TiCl_4$ and $AlCl_3$ is well known and disclosed in U.S. Pat. Nos. 2,488,439, and 2,559,638, the teachings of which are incorporated herein by reference. The $TiO_2$ used to prepare the pigment can be of a conventional rutile or anatase variety, produced by either a chloride or a sulfate process. Preferably, the $TiO_2$ is prepared by the chloride process and a rutile crystal form. The $TiO_2$ particles used to prepare the pigments of this invention can be a base $TiO_2$ referred to herein as $TiO_2$ directly removed from oxidizing $TiCl_4$ and before any finishing steps and/or before any surface treatments are applied. In the sulfate process, base $TiO_2$ refers to $TiO_2$ before any surface treatments are applied. Alternatively, the $TiO_2$ particles used to prepare the pigments of this invention can be a finished $TiO_2$ referred to herein as $TiO_2$ subjected to conventional finishing steps and/or surface treated with hydrous oxides such as alumina, silica, zirconia or the like, or combinations of these materials, as described in, for example, U.S. Pat. No. Re 27,818 and U.S. Pat. No. 4,125,412, the teachings of which are incorporated herein by reference. The hydrous oxides can range from about 16 weight % or less of the total pigment product weight, and preferably 10 weight % or less. Contemplated equivalents include other white pigments such as zinc oxide, zinc sulfide, basic lead sulfate, basic lead carbonate, antimony oxide, lithopone or the like.

The inorganic particles used to coat the $TiO_2$ surface or its equivalent in carrying out the invention can be varied. Preferably, the inorganic particles do not substantially absorb visible light and do not adversely interact with other components in an end use application. One important aspect is the size of the inorganic particles (primary particles), i.e., it is desirable that the inorganic particles are smaller than the $TiO_2$ pigment particles. Typically, the average size is within the range of about 5 to about 100 nm in diameter, preferably about 7 to about 50 nm, and more preferably about 10 to about 35 nm. The inorganic particles form a non-continuous coating of a discrete particulate form and can be observed and measured by electron microscopy such as transmission electron microscopy. Examples of inorganic particles include, but are not limited to particles of the following inorganic materials including those in hydrated form: oxides of silicon, titanium, zirconium, zinc, magnesium, aluminum, yttrium, antimony, cerium, and tin; sulfates of barium and calcium; sulfides of zinc; carbonates of zinc, calcium, magnesium, lead and mixed metals; nitrides of aluminum; phosphates of aluminum, calcium, magnesium, zinc, cerium and mixed metals; titanates of magnesium, calcium, aluminum and mixed metals; fluorides of magnesium and calcium; silicates of zinc, zirconium, calcium, barium, magnesium, mixed alkaline earths and naturally occurring silicate minerals and the like; aluminosilicates of alkali and alkaline earths, and naturally occurring aluminosilicates and the like; oxalates of calcium, zinc, magnesium, aluminum and mixed metals; aluminates of zinc, calcium, magnesium, and mixed alkaline earths; hydroxides of aluminum; diamond; or the like and above mixtures or composites thereof. Mixtures used herein are a physical mixture of inorganic particles containing more than one type of particulate form. Composites used herein is intimate combinations of two or more inorganic materials in a single particle or any other combination wherein at least two distinct inorganic materials are present in an aggregate particle.

Preferred are silica, titanium dioxide, zirconium oxide, zinc oxide, magnesium oxide, aluminum oxide, tin oxide, calcium carbonate, magnesium carbonate, aluminum phosphate, calcium phosphate, aluminosilicates including alkali and alkaline earth aluminosilicates and naturally occurring aluminosilicate and the like, calcium silicates and naturally occurring silicate minerals and above mixtures or composites thereof.

More preferred are amorphous silica, hydrated forms of alumina, aluminosilicates including alkali and alkaline earth aluminosilicates, calcium silicates, titanium dioxide, calcium phosphate and calcium carbonate and above mixtures or composites thereof. Examples of silica are commercially available under the tradenames Ludox® colloidal silica which is available from E. I. du Pont de Nemours and Company, Nalcoag® which is available from Nalco Chemical Company, and Nyacol® which is available from Akzo Nobel.

The amount and size of inorganic particles will influence the surface area and thus impact the oil absorption of the product, as described hereinbelow. For example, larger size inorganic particles within the above prescribed ranges and/ or fewer inorganic particles can be used to avoid or minimize increasing oil absorption. Typically, the inorganic particle is less than about 20 weight %, based on the total weight of the coated $TiO_2$, preferably less than about 15 weight %, and more preferably less than about 10 weight %. The inorganic particles can be amorphous or crystalline and any shape is suitable such as spherical, equiaxial, rod-like or platelet. Preferably, the inorganic particle is equiaxial or spherical to minimize the oil absorption. It is desirable to have a substantially uniform distribution of the inorganic particles on the surface of the $TiO_2$ particles. The inorganic particles will be attracted to the $TiO_2$ surface by van der Waals' forces and may be further anchored to the $TiO_2$ surface by chemical bonding and/or by hydrous oxide coatings, if present as a topcoat.

Aggregates or agglomerates of inorganic primary particles are also useful as long as the average diameter of the aggregate or agglomerate is within the above prescribed size range of the inorganic primary particles. Aggregates are distinguished from agglomerates in that aggregates are held together by strong bonds such as fusion bonds and cannot be fragmented easily, while agglomerates are weakly bonded and can be broken up by high energy agitation.

These novel products of this invention have a surface area of less than about 33 $m^2/g$, preferably less than about 25 $m^2/g$ and more preferably less than about 20 $m^2/g$, and an oil absorption of less than about 35, preferably less than about 25 and more preferably less than about 23.

In the process of this invention, a $TiO_2$ slurry is prepared with base $TiO_2$. A colloidal suspension of inorganic particles, i.e., a sol is added to the $TiO_2$ slurry with sufficient mixing. Mixing can be carried out by any suitable means at a ratio of $TiO_2$ particles to inorganic particles which achieves the desired weight % of the final product. "Sol" is defined herein as a stable dispersion of colloidal particles in a liquid containing about 1 to 60% by weight inorganic particles as a dispersion in a liquid typically water. "Colloidal" is used herein to refer to a suspension of small particles which are substantially individual or monomeric particles small enough that they do not settle. It is preferred that the colloidal suspension is at the highest concentration at which the suspension is stable, typically about 14 to 50 wt %. These are commercially available or can be prepared as known in the art. For example, commercially available colloidal silica is about 40–50 wt % and commercially available colloidal alumina is about 20 wt %. Surprisingly, it has been found that both the particles in the $TiO_2$ slurry and the particles in the colloidal suspension are preferably both above or both below their respective isoelectric points to achieve a substantially uniform surface coating. The "isoelectric point" is used herein to refer to the pH at which particles have a neutral net charge. Opposite charges of the $TiO_2$ particles in the slurry and the inorganic particles in the colloidal suspension are also contemplated.

Optionally, hydrous oxides are precipitated onto the base $TiO_2$ particles or $TiO_2$ particles which have been coated with inorganic particles. Such hydrous oxides are silica, alumina, zirconia or the like. These may be added either before or after the addition of inorganic particles. If the hydrous oxides are added prior to addition of inorganic particles, then a filtering and washing step may be used prior to the addition of inorganic particles for colloidal suspensions which may be sensitive to flocculation. It is preferred that the inorganic particles are added before the hydrous oxides are precipitated to further anchor the inorganic particles to the $TiO_2$ surface. For example, the method for precipitating the hydrous oxides is described in U.S. Pat. No. Re 27,818 and U.S. Pat. No. 4,125,412, the teachings of which are incorporated herein by reference. In precipitating the hydrous oxides, sodium silicate, potassium silicate or any other form of soluble silica is added and neutralized with acid such as HCl, $H_2SO_4$, $HNO_3$, $H_3PO_4$ or the like and then sodium aluminate is added and neutralized with acid. Other means of precipitating hydrous alumina are suitable, such as neutralization of aluminum sulfate or aluminum chloride by base such as NaOH. The amount of hydrous oxides can vary from about 0 to 16 wt %, based on the weight of the total coated $TiO_2$ pigment. Preferred amounts are 0 to 8 wt % silica, more preferably 0 to 4 wt % silica, and 0 to 8 wt % alumina and more preferably about 0 to 3 wt % alumina. The order of addition is not particularly critical, however, the hydrous alumina precipitation, if added, is the last preferred addition. The conventional finishing steps such as filtering, washing, drying and grinding are known and are subsequently carried out. The resulting product is a dry, finished pigment which is useful for end use applications and/or can be used to prepare a slurry useful for end use applications. Methods for preparing slurries are known in the art, for example, as described in Canadian Patent 935,255, the teachings of which are incorporated herein by reference.

An alternative method of carrying out the invention is forming a mixture by combining a liquid medium such as water with the colloidal suspension of inorganic particles as described above in the presence of at least one dispersant to form a mixture. The dispersant can be either added simultaneously with water or subsequently. The dispersant can be selected from those described in U.S. Pat. No. 5,393,510, the teachings of which are incorporated herein by reference. Examples of dispersants include alcohol amines such as 2-amino-2-methyl-1-propanol, 2,2',2"-nitrilotrisethanol, 2,2'-iminobisethanol, 2-aminoethanol and the like, and 1-amino-2-propanol, polyacrylates, citric acid and tetrapotassium pyrophosphate (TKPP) and the like. Typically a combination of the above dispersants is preferred in an amount of about 0.05 to about 5% based on the $TiO_2$ weight. The concentration of inorganic particles in the colloidal suspension is from about 10 to 60 weight % preferably about 30 to 60 wt %. It is preferable that the inorganic colloidal particles are well dispersed and not in an aggregate or flocculated form. As described above, both positive or both negative charges of the inorganic particles in the colloidal suspension and the $TiO_2$ particles are preferred to achieve a substantially uniform surface coating. To this mixture, finished $TiO_2$ is added with high shear mixing or milling as described in greater detail in Canadian Patent 935,255, U.S. Pat. Nos. 3,702,773 and 4,177,081, the teachings of which are incorporated herein by reference. In carrying out the mixing, a high shear mixer or mill such as a Waring blender, homogenizer, serrated disc type agitator, ball mill, sand mill, disc mill, pearl mill, high speed impeller mill or the like can be used. Specific speed characteristics depend on equipment, blade configuration, size, etc., but can be determined readily by one skilled in the art. Total solids content of the resulting slurry is above about 50% by weight, and above 70% by weight is preferred.

In yet another embodiment, inorganic particles are formed in the presence of $TiO_2$. A $TiO_2$ slurry is formed and reagents are added to generate and to deposit a surface coating of the inorganic particles within the prescribed size range. It is preferable that the $TiO_2$ is subjected to washing prior to formation and deposition of the inorganic particles. Hydrous oxides can be added either before or after the formation of the inorganic particles. For example, calcium carbonate may be formed in-situ by the carbonation of hydrated lime, calcium hydroxide. In carrying out the process, $CO_2$ gas and a $TiO_2$ and calcium hydroxide slurry are mixed at high speed, high shear as described in the previous embodiment. A slight excess of $CO_2$ is useful to complete the reaction rapidly.

The resulting improved $TiO_2$ pigment product is suitable for use in coating applications for example in architectural coatings, industrial coatings, paper coatings, and in paper, paper laminates, plastics and inks. The enhanced scattering efficiency is best demonstrated in coatings with greater than 15% PVC, preferably greater than 20% PVC, and more preferably greater than 25%. PVC is expressed as a percentage and represents the sum of the pigment volume and extender volume, if present, divided by the sum of the resin volume, extender volume, if present, and pigment volume. Examples include but are not limited to semi-flat interior paints, such as eggshell or satin, and exterior flat paints, and industrial coil coatings. It will be appreciated by those skilled in the art that the semi-flat paints are formulated below the critical pigment volume concentration (CPVC) to maintain film integrity for scrub and stain resistance. The exterior flat paints are formulated at or near the CPVC to maintain film integrity and to obtain maximum weatherability. The CPVC is defined herein as the specific PVC at which the vehicle demand of the pigment is precisely satisfied, as described in greater detail in C. Martens, "Technology of Paints, Varnishes and Lacquers", 1968, pp. 498–500, the teachings of which are incorporated herein by reference. This concentration is critical because above or below this value the properties of a formulation change dramatically. The $TiO_2$ paint formulations are made by techniques known in the art and are described in greater detail in *Paint and Surface Coating—Theory and Practice*, edited by R. Lambourne, Ellis Harwood Limited (1987) and *Principles of Paint Formulation*, edited by R. Woodbridge, Blackie & Sons Limited (1991), the teachings of which are incorporated herein by reference.

To give a clearer understanding of the invention, the following Examples are construed as illustrative and not limitative of the underlying principles of the invention in any way whatsoever.

EXAMPLES

Comparative Example 1

A finished $TiO_2$ slurry was made by dispersing 1000 g of an enamel grade $TiO_2$ having hydrous oxide coatings of silica and alumina in 295 g of water containing dispersants using a high speed, high shear mixer with a 2 inch blade at 2000 RPM for 15 minutes. Final solids content of the slurry was 76.5% by weight. The pH was 9.

A latex emulsion paint concentrate was prepared using a Rhoplex® HG-74M acrylic copolymer vehicle, available from Rohm & Haas Company, modified for compability with the finished $TiO_2$ slurry. The paint concentrate was made without incorporating any $TiO_2$ and was tinted with a green tinting agent. As formulated, the paint concentrate contained 32% by weight solids.

18.23 g of the $TiO_2$ slurry was combined with 46.77 g of the a latex emulsion paint concentrate and shaken 5 minutes to make a paint with a PVC of 20% in the dried paint film, based on a pigment density of 4.0 $g/cm^3$ and a resin density of 1.07 $g/cm^3$. Similar combinations of pigment slurry and paint concentrate were combined to make paints containing 30 and 35% PVC. These paints were drawn down using a 0.002 inch Bird applicator onto black and white substrates and air dried. The green (Y) reflectance values over black and white were measured and the Kubelka-Munk K/S values calculated and reported in Table 1. The green (Y) reflectance value was measured using a Hunter Lab Scan reflectance spectrocolorimeter. The Kubelka-Munk (K/S) values were calculated using equations found in D. B. Judd and G. Wyszecki, "Color in Business, Science and Industry", 2nd ed., John Wiley & Sons, N.Y., 1963, pp. 396-397, the teachings of which are incorporated herein by reference.

EXAMPLE 2

The same enamel grade $TiO_2$ (910 g), was dispersed as in Comparative Example 1 in about 160 g of water containing dispersants and 225 g of a 40 wt % dispersion of colloidal silica in water, (Ludox® AS-40 colloidal silica, nominal particle size 22 nm, available from DuPont). The final slurry contained 76.5 wt % solids. On a dry weight basis, the pigment was comprised of 9% $SiO_2$ derived from colloidal silica. It had a calculated density of 3.73 $g/cm^3$ (based on a silica density of 2.2 $g/cm^3$). Green tinted paints were made as in Comparative Example 1 at PVCs of 20, 30, and 35% with adjustment for the lower pigment density. K/S values were obtained from drawdowns on black and white substrates. Results are in Table 1.

EXAMPLES 3–4

Similar combinations of Ludox® AS-40 and $TiO_2$ were made as in Example 2 to produce slurries of pigments comprised of 4.5% and 2.5% $SiO_2$ derived from colloidal silica (calculated pigment densities were 3.86 and 3.92 $g/cm^3$, respectively). Slurry wt % solids were 76.5%. Green tinted paints at 20, 30, and 35% PVCs were made as in the above Examples and K/S values were similarly obtained. Results are in Table 1.

Tinting strengths were calculated at each PVC for Examples 2–4 relative to the Comparative Example 1 by taking the ratio of K/S of the Comparative Example divided by K/S for the Examples 2–4. At any particular PVC, K is constant due to a constant concentration of green pigment. Thus, tinting strength is the scattering coefficient, S, normalized to the Comparative Example. See Table 1. The higher tinting strengths of Examples 2–4 than of Comparative Example 1, despite the lower contents of $TiO_2$ in the paint, demonstrates the improvements in scattering coefficient.

TABLE 1

K/S VALUES AND RELATIVE TINTING STRENGTHS

|  | PVC = 20% | PVC = 30% | PVC = 35% |
| --- | --- | --- | --- |
|  | K/S values | | |
| Comparative Example 1 | 0.140 | 0.108 | 0.100 |
| Example 2 | 0.137 | 0.100 | 0.088 |
| Example 3 | 0.132 | 0.102 | 0.091 |
| Example 4 | 0.134 | 0.103 | 0.094 |
|  | Relative Tinting Strength | | |
| Comparative Example 1 | 100% | 100% | 100% |
| Example 2 | 102% | 108% | 114% |
| Example 3 | 106% | 106% | 109% |
| Example 4 | 104% | 104% | 106% |

EXAMPLE 5

4245 ml of water and 1539 g of base $TiO_2$ prepared by the chloride process from $TiCl_4$, were combined and heated to 90° C. with stirring. The pH was raised to 11 with 165 ml of 10% NaOH. 450 g of Ludox® TM-50 colloidal silica dispersion containing 50% by wt $SiO_2$ with a nominal particle size of 22 nm available from DuPont was added. After stirring 10 min, 267.9 g of sodium silicate solution containing 28% by weight $SiO_2$ and with a $SiO_2$: $Na_2O$ ratio of 3.2 was added. After stirring 10 min, 8% HCl in water was added at a rate of 7 ml/min until the pH reached 7. After 45 minutes at pH about 7 and 90° C., 144 g of sodium aluminate solution was added simultaneously with 380 ml of 8% HCl thus maintaining the pH at 7. After further stirring for 30 minutes the pH was lowered to 6 with HCl and the product was filtered, washed and dried. A second preparation was conducted under the same conditions and the products were combined and ground in a fluid energy mill. The final product was analyzed by x-ray fluorescence and found to contain 2.66% by weight $Al_2O_3$, 15.55% by weight $SiO_2$. Density measured by helium pycnometry was 3.56 g/cm³. Oil absorption was 32.5.

Hiding power is given in Table 2 and compared to a conventional enamel grade titanium dioxide (C2) with low oil absorption and low scattering efficiency, and to a conventional high oil absorption grade with moderate scattering efficiency used in flat paints typically formulated above the CPVC (C3). The product of Example 5 has a moderate oil absorption and improved hiding power. Hiding power measurements were made as described by J. E. McNutt and H. L. Ramsay in *American Paint and Coatings Journal*, April, 1988, p. 46, by the weight drawdown method in an acrylic emulsion resin system (Rhoplex® Multilobe 200 100% acrylic binder) using an average of 3 drawdowns. PVCs were calculated based on the measured $TiO_2$ pigment densities. No extender pigments and no colored pigments were included. The $TiO_2$ product is the only pigment present. Hiding power was determined using Y, the green reflectance measured over black and white backgrounds. Hiding power is expressed as scattering efficiency, S, in units of m²/g of product.

TABLE 2

SCATTERING EFFICIENCY OF $TiO_2$ PRODUCT IN AN ACRYLIC EMULSION RESIN

|  | O.A.* | S (m²/g) 25% PVC | S (m²/g) 35% PVC |
| --- | --- | --- | --- |
| Example 5 | 32.5 | 0.363 | 0.320 |
| Example 6 | 19 | 0.350 | 0.297 |
| Example 7 | 18 | 0.336 | 0.287 |
| Example 8 | 17 | 0.330 | 0.276 |
| C2 | 16–18 | 0.303 | 0.253 |
| C3 | 37 | 0.326 | 0.295 |

* Oil Absorption (ASTM Designation D281): The oil absorption value obtained gives information about the vehicle demand of the pigment when it is used in a paint and aids in paint formulation.

In a dry coating application (a paint film) formed from a latex emulsion, formulated below the CPVC and comprised of the product of these embodiments but with no extenders, the hiding power (expressed as scattering efficiency, S, in units of square meters per gram [m²/g] of product of this invention) is greater than 0.31 m²/g at 25% PVC and greater than 0.26 m²/g at 35 PVC, and preferably greater than 0.33 m²/g at 25% PVC and preferably greater than 0.28 m²/g at 35 % PVC.

EXAMPLE 6

8520 ml of water and 3080 g of the base $TiO_2$ used in Example 5 were combined and heated to 74° C. while stirring. 76 ml of 10% NaOH was added increasing the pH to 9.5. 110 g of sodium silicate was added and stirred 10 minutes. 607 g of Ludox® TM-50 was added and stirred 15 minutes. Another portion of 110 g of sodium silicate was added and stirred. 8% HCl was added at about 7 ml/min until the pH reached about 7. After stirring at 75° C. for 60 min, 265 g of sodium aluminate solution and 720 ml of 8% HCl were added simultaneously. The slurry was stirred an additional 30 min at 75° C., pH was lowered to 6, and the product was subjected to conventional finishing steps as described in Example 5. The product contained 2.43% $Al_2O_3$ and 10.04% $SiO_2$; density was 3.63 g/cm³ and oil absorption was 19. Surface area was 25.2 m²/g as measured by the nitrogen BET method.

Scattering efficiency is shown in Table 2. This product has a low oil absorption and a high hiding power.

EXAMPLE 7

The procedure used in Example 6 was followed except that 290 g of Ludox® TM-50 was used and 8% HCl was added at 5.5 ml/min. The product contained 2.6% $Al_2O_3$, 5.9% $SiO_2$; it had a density of 3.80 g/cm³, an oil absorption of 18 and a surface area of 19.7 m²/g.

Scattering efficiency is shown in Table 2. This product has a low oil absorption and a high hiding power.

EXAMPLE 8

The procedure used in Example 7 was followed except that 290 g of colloidal silica as a 50% by weight dispersion in water having a particle size of nominally 35 nm diameter was used instead of Ludox® TM-50. The final $TiO_2$ product contained 2.53% $Al_2O_3$, 5.95% $SiO_2$, with a density of 3.80 g/cm³ and an oil absorption of 16.8.

Scattering efficiency is shown in Table 2. This product has a low oil absorption and a high hiding power.

EXAMPLE 9

The procedure used in Example 7 was followed except that 161 g of Ludox® TM-50 was used. The product contained 2.43% $Al_2O_3$ and 4.17% $SiO_2$, had a density of 4.04 g/cm$^3$, a surface area of 15.3 m$^2$/g and an oil absorption of 19.7.

EXAMPLE 10

8520 ml of water and 3080 g of the base $TiO_2$ used in Examples 5-9 were combined and heated with stirring to 90° C. The pH was adjusted to 10 and 400 g of Ludox® TM-50 was added and stirred 15 min. Then 220 g of sodium silicate was added, stirred 10 min and 8% HCl addition begun at a rate of 7 ml/min. After pH reached 7, HCl addition was stopped and stirring continued for 45 rain at 90° C. Then 265 g of sodium aluminate and 740 ml of 8% HCl were added simultaneously. The slurry was stirred for an additional 30 min as the temperature dropped from 86 to 70° C. The pH was decreased to 6 by HCl addition and the product was filtered washed and dried. After grinding, the product contained 2.56 $Al_2O_3$, 7.54% $SiO_2$. Surface area was 16.2 m$^2$/g, density was 3.95 g/cm$^3$, and oil absorption was 22.6.

The methods used to measure scattering efficiency in Examples 5-8 were repeated. Results are shown below in Table 3.

EXAMPLE 11

The procedure in Example 10 was followed except that the colloidal silica from Example 8 was used. The product contained 2.47 $Al_2O_3$, 7.47% $SiO_2$. Surface area was 18.1 m$^2$/g, density was 3.92 g/cm$^3$, and oil absorption was 20.6. Results are shown in Table 3.

TABLE 3

| Scattering Efficiency, S, (m$^2$/g) with no extenders: | | |
|---|---|---|
| PVC % | Example 10 | Example 11 |
| 18.8 | 0.370 | 0.339 |
| 23.4 | 0.343 | 0.318 |
| 27.9 | 0.334 | 0.300 |
| 32.9 | 0.288 | 0.270 |
| 37.8 | 0.265 | 0.237 |

EXAMPLE 12

283 ml of water and 102.6 g of the base $TiO_2$ in Examples 5-11 were combined and stirred. This was heated to 90° C. and pH adjusted to about 11. 15 g of Ludox® TM-50 was added, stirred 10 min and then 8.93 g of sodium silicate was added and stirred 10 min. A solution of 4% by weight HCl was added at about 0.5 ml/min until the pH reached 7. After further stirring at 90° C. and pH about 7, a small sample was removed, filtered, washed and dried. Transmission electron micrographs and scanning electron micrographs show the product morphology as discrete silica particles, approximately 20-25 nm in diameter, attached to the surface of the rutile titanium dioxide particles. $SiO_2$ derived from colloidal silica was about 6-7 wt %. To the remaining major portion of the reaction slurry, 9.6 g of sodium aluminate and 27.4 ml of 8% HCl were added simultaneously. The pH was adjusted to 7 and the slurry stirred at about 75° C. for 30 min. The pH was then adjusted to about 6 and the final product was filtered, washed, and dried. The product contained 2.77% $Al_2O_3$, 8.46% $SiO_2$, and 88.76% $TiO_2$ (normalized to 100%).

EXAMPLE 13

800 ml of water and 200 g of the base $TiO_2$ used in Examples 5-12 were combined and stirred. The slurry was filtered and washed with water. Half of the resulting wet filter cake was resuspended in water with stirring to a total volume of 400 ml. The pH was adjusted to 3.5 with HCl. 40 g of Dispal® 23N4-20 colloidal alumina dispersion available from Vista Chemical Company was added. This was then heated to 40° C. and pH was adjusted to 10 with 10% NaOH. The slurry was further heated to 60° C. and 5.4 g of sodium silicate solution (28 wt. % $SiO_2$) was diluted in 20 ml of water and added to the $TiO_2$ slurry. The pH was adjusted to 9 and the slurry was stirred for 5 min. The slurry was then adjusted to pH 7, and the product recovered after filtering, washing and drying. The product was analyzed 9.1% $Al_2O_3$, 1.4% $SiO_2$ and 89.4% $TiO_2$ (normalized).

EXAMPLE 14

50 g of Ti-Pure®, R-706, available from DuPont was dispersed in 150 ml of water at room temperature and stirred vigorously in a high shear, high speed mixer. 3.0 g of $Ca(OH)_2$ was added. While continuing high shear mixing, carbon dioxide was bubbled into the slurry at approximately 300 ml/min for 5 minutes as the pH decreased to about 6.5. The slurry was filtered, washed with a small amount of water and dried at 115° C. Transmission electron micrographs of the product show crystallites of calcium carbonate, roughly equiaxial in shape and typically 20 to 40 nm across which were distributed on the surface of the $TiO_2$ particles. When analyzed by x-ray fluorescence, the composition was 87.9% $TiO_2$, 2.48% $Al_2O_3$, 2.69% $SiO_2$ and 4.38% CaO (analyzed as the oxide). Weight loss measured with a thermogravimetric analyzer in the temperature range from 500° to 750° C. demonstrated that most of the calcium was present as $CaCO_3$. Surface area was 13.3 m$^2$/g.

EXAMPLE 15

8500 ml of water and 3000 g of base $TiO_2$ were combined and heated to 60° C. while stirring. 8 ml of 10% NaOH was added increasing the pH to about 9. 315 g of Ludox® HS-40 colloidal silica available from DuPont was added. Ludox® HS-40 is a 40 wt. % silica dispersion of 12 nm diameter silica particles. After stirring 15 minutes at 70° C., 225 g of sodium silicate solution was added. After stirring 10 minutes, 8% HCl solution was added at about 10 ml/min. After addition of 220 ml, pH was 8.5 and addition was stopped. After 30 minutes stirring at 70° C., additional HCl was added to bring pH to 7.5. 265 g of sodium aluminate solution and 715 ml of 8% HCl were added simultaneously. The pH was 7.5 after these additions. After 30 minutes stirring, pH was lowered to 7.0 and the product was filtered, washed and dried. The product was analyzed to contain 91.1% $TiO_2$, 2.8% $Al_2O_3$ and 6.1% $SiO_2$ (normalized to 100%). Oil absorption was 24.2. Scattering coefficients were measured: 0.384 m$^2$/g at 14.7% PVC and 0.327 m$^2$/g at 23.5% PVC and 0.265 m$^2$/g at 34.1% PVC.

EXAMPLE 16

Dry base $TiO_2$ (950 grams) is dispersed by slowly adding it to a suspension containing Ludox® AS-40 colloidal silica (125 grams), water (175 grams) and dispersants while stirring with a high speed, high shear impeller. The pH is between 8 and 9. Stirring is continued for about 20 minutes. 84 grams of water is added so that the resulting slurry product contains about 75% solids by weight. On a dry weight basis, the slurry product comprises about 5% $SiO_2$ derived from the colloidal silica dispersion.

Having thus described and exemplified the invention with a certain degree of particularity, it should be appreciated that the following claims are not to be limited but are to be afforded a scope commensurate with the wording of each element of the claims and equivalents thereof.

What is claimed is:

1. A $TiO_2$ pigment consisting essentially of $TiO_2$ particles having (a) substantially discrete inorganic particles having an average diameter size within the range of about 5 to about 100 nm dispersed on the surfaces of the $TiO_2$ particles in an amount of less than 20 wt. % based on total pigment weight, and (b) a top-coating comprising a hydrous oxide selected from the group consisting of silica, alumina, zirconia, and mixtures thereof.

2. A $TiO_2$ pigment consisting essentially of $TiO_2$ particles having (a) a surface-coating comprising a hydrous oxide selected from the group consisting of silica, alumina, zirconia, and mixtures thereof, and (b) substantially discrete inorganic particles having an average diameter size within the range of about 5 to about 100 nm which are dispersed on the surface of the hydrous oxide surface-coating in an amount of less than 20 wt. % based on total pigment weight.

3. The $TiO_2$ pigment of claim 1 or 2, wherein the inorganic particles are selected from the group consisting of oxides of silicon, titanium, zirconium, zinc, magnesium, aluminum, yttrium, antimony, cerium, and tin; sulfates of barium and calcium; sulfides of zinc; carbonates of zinc, calcium, magnesium, lead, and mixed metals; nitrides of aluminum; phosphates of aluminum, calcium, magnesium, zinc, and cerium; titanates of magnesium, calcium, and aluminum; fluorides of magnesium and calcium; silicates of zinc, zirconium, calcium, barium, magnesium, mixed alkaline earth metals and naturally occurring silicate minerals; aluminosilicates of alkali and alkaline earth metals; naturally occurring aluminosilicates; aluminates of zinc, calcium, magnesium, and mixed alkaline earth metals; hydroxides of aluminum; diamond; and mixtures or composites of the foregoing particles.

4. The $TiO_2$ pigment of claim 1 or 2, wherein the inorganic particles have an average diameter size within the range of 7 to 50 nm.

5. The $TiO_2$ pigment of claim 1 or 2, wherein the amount of inorganic particles is up to 15 wt. % and the amount of hydrous oxides is up to 16 wt. % based on total pigment weight.

6. The $TiO_2$ pigment of claim 1 or 2, wherein the amount of inorganic particles is up to 10 wt. % and the amount of hydrous oxides is up to 16 wt. % based on total pigment weight.

7. The $TiO_2$ pigment of claim 6, wherein the inorganic particles are selected from the group consisting of silica, alumina, calcium carbonate, and mixtures or composites thereof.

8. The $TiO_2$ pigment of claim 7, wherein the pigment has an oil absorption of less than 35.

9. The $TiO_2$ pigment of claim 1 or 2, wherein the inorganic particles comprise silica particles in an amount up to 10 wt. % based on total pigment weight, and the hydrous oxides comprise up to 4 wt. % silica and up to 3 wt. % alumina based on total pigment weight.

10. The $TiO_2$ pigment of claim 9, wherein the pigment has an oil absorption of less than 25.

11. The $TiO_2$ pigment of claim 9, wherein the pigment has a light scattering coefficient greater than 0.31 $m^2/g$ at 25% pigment volume concentration and greater than 0.26 $m^2/g$ at 35% pigment volume concentration.

12. A $TiO_2$ pigment slurry comprising the $TiO_2$ pigment of claim 1 or 2, wherein the slurry has a $TiO_2$ pigment solids content above 50 wt. %.

13. A process for preparing a $TiO_2$ pigment, comprising the steps of:
   (a) mixing a slurry of $TiO_2$ particles with a colloidal suspension of inorganic particles, wherein the $TiO_2$ particles and the colloidal particles are both above or below their respective isoelectric points such that substantially discrete inorganic particles having an average diameter size within the range of about 5 to about 100 nm are dispersed onto the surfaces of the $TiO_2$ particles in an amount of less than 20 wt. % based on total pigment weight; and
   (b) precipitating a hydrous oxide selected from the group consisting of silica, alumina, zirconia, and mixtures thereof onto the $TiO_2$ particles resulting from step (a).

14. A process for preparing a $TiO_2$ pigment, comprising the steps of:
   (a) precipitating a hydrous oxide selected from the group consisting of silica, alumina, zirconia, and mixtures thereof onto the surfaces of $TiO_2$ particles to form surface-coatings, and
   (b) mixing a slurry of the surface-coated $TiO_2$ particles with a colloidal suspension of inorganic particles, wherein the $TiO_2$ particles and the colloidal particles are both above or below their respective isoelectric points such that substantially discrete inorganic particles having an average diameter size within the range of about to about 100 nm are dispersed onto the surface-coated $TiO_2$ particles in an amount of less than 20 wt. % based on total pigment weight.

15. A process for preparing a $TiO_2$ pigment, comprising the steps of:
   (a) mixing a slurry of $TiO_2$ particles with reagents to form in-situ substantially discrete inorganic particles having an average diameter size within the range of about 5 to about 100 nm, wherein the inorganic particles are dispersed onto the surfaces of the $TiO_2$ particles in an amount of less than 20 wt. % based on total pigment weight; and
   (b) precipitating a hydrous oxide selected from the group consisting of silica, alumina, zirconia, and mixtures thereof onto the $TiO_2$ particles resulting from step (a).

16. A process for preparing a $TiO_2$ pigment, comprising the steps of:
   (a) precipitating a hydrous oxide selected from the group consisting of silica, alumina, zirconia, and mixtures thereof onto the surfaces of $TiO_2$ particles to form surface-coatings, and
   (b) mixing a slurry of the surface-coated $TiO_2$ particles with reagents to form in-situ substantially discrete inorganic particles having an average diameter size within the range of about 5 to about 100 nm, wherein the inorganic particles are dispersed onto the surface-coated $TiO_2$ particles in an amount of less than 20 wt. % based on total pigment weight.

17. A process for preparing a $TiO_2$ pigment slurry, comprising the steps of:
   (a) preparing finished $TiO_2$ particles having a surface-coating comprising a hydrous oxide selected from the group consisting of silica, alumina, zirconia, and mixtures thereof; and
   (b) mixing the finished $TiO_2$ particles with an aqueous mixture comprising a colloidal suspension of inorganic particles and dispersant, wherein the $TiO_2$ particles and the colloidal particles are both above or below their respective isoelectric points, to form substantially discrete inorganic particles having an average diameter size within the range of about 5 to about 100 nm which are dispersed onto the surfaces of the $TiO_2$ particles in an amount of less than 20 wt. % based on total pigment weight.

* * * * *